US012803386B2

(12) United States Patent
Lang et al.

(10) Patent No.: US 12,803,386 B2
(45) Date of Patent: Nov. 17, 2026

(54) COMPONENT FOR A ROTOR OF AN ELECTRIC MACHINE HAVING A SLOT INSULATION ELEMENT AND HEAT SINK

(71) Applicant: Bayerische Motoren Werke Aktiengesellschaft, Munich (DE)

(72) Inventors: Markus Lang, Munich (DE); Robert Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 197 days.

(21) Appl. No.: 18/727,400

(22) PCT Filed: Mar. 17, 2023

(86) PCT No.: PCT/EP2023/056921
§ 371 (c)(1),
(2) Date: Jul. 9, 2024

(87) PCT Pub. No.: WO2023/198401
PCT Pub. Date: Oct. 19, 2023

(65) Prior Publication Data

US 2025/0096650 A1 Mar. 20, 2025

(30) Foreign Application Priority Data

Apr. 13, 2022 (DE) ..................... 10 2022 109 033.7

(51) Int. Cl.
*H02K 3/34* (2006.01)
*H02K 1/24* (2006.01)
(Continued)

(52) U.S. Cl.
CPC ............... *H02K 9/227* (2021.01); *H02K 1/24* (2013.01); *H02K 3/325* (2013.01)

(58) Field of Classification Search
CPC ............... H02K 3/24; H02K 1/32; H02K 3/32
See application file for complete search history.

(56) References Cited

U.S. PATENT DOCUMENTS

| | | | | |
|---|---|---|---|---|
| 3,596,120 A * | 7/1971 | Potter | H02K 9/00 | 310/61 |
| 4,994,700 A * | 2/1991 | Bansal | H02K 3/48 | 310/60 A |

(Continued)

FOREIGN PATENT DOCUMENTS

| | | |
|---|---|---|
| DE | 10 2018 102 754 A1 | 8/2019 |
| JP | 58-95951 A | 6/1983 |

(Continued)

OTHER PUBLICATIONS

JP-58095951-A Machine Translation (Year: 1983).*

(Continued)

*Primary Examiner* — Oluseye Iwarere
*Assistant Examiner* — Masoud Vaziri
(74) *Attorney, Agent, or Firm* — Crowell & Moring LLP

(57) ABSTRACT

A component for lining a slot that is formed between two poles of a rotor core of a rotor, and that extends axially between two end faces of the rotor core, having a slot insulation element electrically insulating winding sections, arranged in the slot, from the rotor core. The slot insulation element has two side regions for resting on slot edges of the slot, and a base region arranged to overlap with a slot base of the slot, wherein a bottom, facing the slot base, of the base region has an axially extending notch. The component has a heat sink having a cooling fluid-carrying channel for cooling the winding sections arranged in the slot insulation element, which heat sink is arranged in the notch of the slot insulation element so as to be arranged on the slot base and is mechanically connected to the slot insulation element.

11 Claims, 8 Drawing Sheets

(51) Int. Cl.

| | |
|---|---|
| ***H02K 3/32*** | (2006.01) |
| ***H02K 9/22*** | (2006.01) |

(56) References Cited

U.S. PATENT DOCUMENTS

| | | | | |
|---|---|---|---|---|
| 6,759,771 | B2 | 7/2004 | Doherty et al. | |
| 7,598,635 | B2 * | 10/2009 | Howard | H02K 9/197 310/269 |
| 8,729,752 | B2 | 5/2014 | Birdi et al. | |
| 2016/0149451 | A1 * | 5/2016 | Teter | H02K 3/24 310/54 |
| 2020/0295614 | A1 * | 9/2020 | Cunningham | H02K 1/20 |
| 2021/0044160 | A1 | 2/2021 | Leiber | |

FOREIGN PATENT DOCUMENTS

| | | | | | |
|---|---|---|---|---|---|
| JP | 58-95952 | A | | 6/1983 | |
| JP | 58095951 | A | * | 6/1983 | H02K 9/00 |
| KR | 10-2011-0012174 | A | | 2/2011 | |

OTHER PUBLICATIONS

International Search Report (PCT/ISA/210) issued in PCT Application No. PCT/EP2023/056921 dated Jun. 30, 2023 with English translation (5 pages).

German-language Written Opinion (PCT/ISA/237) issued in PCT Application No. PCT/EP2023/056921 dated Jun. 30, 2023 with English translation (9 pages).

German-language Search Report issued in German Application No. 10 2022 109 033.7 dated Aug. 24, 2022 with partial English translation (14 pages).

* cited by examiner

COMPONENT FOR A ROTOR OF AN ELECTRIC MACHINE HAVING A SLOT INSULATION ELEMENT AND HEAT SINK

BACKGROUND AND SUMMARY

The present disclosure relates to a component for lining a slot that is formed between two poles of a rotor core of a rotor and that extends axially between two end faces of the rotor core. The component comprises a slot insulation element for electrically insulating winding sections of windings of the rotor from the rotor core, the winding sections being arranged in the slot, the slot insulation element having two side areas for contact with slot flanks of the slot and a base area for overlapping arrangement with a slot base of the slot. The present disclosure relates furthermore to an assembly, a rotor and an electric machine.

In the present case, interest is focused on electric machines that can be used, for example, as drive machines for electrified motor vehicles, i.e. electric or hybrid vehicles. Such electric machines usually have a stator and a rotor that is mounted so as to be able to rotate relative to the stator. In the case of a current-excited electric machine, both the stator and the rotor have windings which can be energized and which are arranged in slots in a stator or rotor core. The respective core can be designed as a lamination stack consisting of axially stacked metal lamellas. In order to electrically insulate the windings from the respective core, it is known from the prior art to line the slots with slot insulation elements.

In order to improve the continuous performance of the electric machines, the electric machines are usually cooled. In particular, heat is generated at the windings, which in the case of the rotor can be dissipated, for example, via a rotor shaft of the rotor that passes through the rotor core and carries cooling fluid. However, the disadvantage here is that the rotor shaft that passes through the rotor core is arranged at a distance from the windings and therefore heat transfer from the windings to the cooling fluid is not optimal.

It is an object of the present disclosure to provide a simple solution for cooling the windings of a rotor of an electric machine.

According to the present disclosure, this object is achieved by a component, an assembly, a rotor and an electric machine having the features according to the present disclosure. Advantageous embodiments of the present disclosure are also the subject of the description and the figures.

A component according to the present disclosure is used to line a slot that is formed between two poles of a rotor core of a rotor and that extends axially between two end faces of the rotor core. The component has a slot insulation element for electrically insulating winding sections of windings of the rotor from the rotor core, the electrically insulating winding sections being arranged in the slot. The slot insulation component has two side areas for contact with slot flanks of the slot and a base area for overlapping arrangement with a slot base of the slot. In addition, an underside of the base area of the slot insulation element facing the slot base has an axially extending notch. Furthermore, the component has a heat sink with at least one cooling fluid-carrying cooling duct for cooling the winding sections that are arranged in the slot insulation element, and the heat sink is arranged in the notch of the slot insulation element for arrangement on the slot base and is mechanically connected to the slot insulation element.

The present disclosure also relates to an assembly for arrangement on a rotor core of a rotor of an electric machine. The assembly has a number of components according to the present disclosure corresponding to a number of slots and a fluid conduit device for arrangement on one of the end faces of the rotor core. The fluid conduit device is fluidically coupled to the cooling ducts of the components for distributing the cooling fluid to the components and for collecting the cooling fluid from the components. The present disclosure also relates to a rotor for an electric machine comprising a rotor core, magnetic field-generating windings, which are arranged in slots of the rotor core, and an assembly according to the present disclosure, wherein the components are arranged in the slots of the rotor core between the winding sections of the windings and the fluid conduit device is arranged on one of the end faces of the rotor core. An electric machine according to the present disclosure comprises a stator and a rotor according to the present disclosure that is mounted so as to be able to rotate with respect to the stator. The electric machine is a separately excited electric machine and can be used, for example, as a drive machine for an electrified motor vehicle.

The rotor core can, for example, be designed as a lamination stack made of axially stacked metal lamellae and have slots that are arranged distributed in the circumferential direction. Preferably, the rotor is a salient pole rotor and has a rotor core with a salient-pole design. This has an annular yoke which is arranged around a rotor shaft of the rotor and poles in the form of salient poles protrude radially from the yoke. Each salient pole has a pole tooth or pole shaft, which projects radially from the yoke, and a circular segment-shaped pole shoe that is arranged on the pole tooth. Winding conductors of the windings of the rotor can be wound around the pole teeth so that the windings are arranged in a radial direction between the yoke and the pole shoes. Axial winding sections of the windings are arranged in the slots that are adjacent to the respective salient pole on both sides, so that the axial winding sections of the salient poles that are adjacent to the slot on both sides are arranged next to each other in the circumferential direction in each slot. Star discs can be arranged on the opposing end faces of the rotor core and the star discs are arranged between the end faces of the rotor core and end-side winding sections of the windings, so-called winding heads, and electrically insulate the winding heads from the rotor core.

A contour of an inner surface of the slot that is formed by the radially and axially extending slot flanks and the slot base that extends in the circumferential direction and axially depends on the shape of the adjacent poles. In the case of salient poles, the slot flanks are formed by pole tooth flanks of the adjacent pole teeth and by pole shoe undersides of the adjacent pole shoes. The slot base is formed by an outer side area of the yoke adjacent to the slot. In order to electrically insulate the axial winding sections which are arranged in the slots from the rotor core, a slot insulation element is arranged in the slot. In particular, this covers the inner surface of the slot completely and is therefore arranged between the inner surface of the slot and the axial winding sections. For this purpose, the slot insulation element has the side areas which are in contact with the slot flanks, and the base area which is arranged overlapping with the slot base.

In the case of the salient pole rotor, the side areas of the slot insulation element are respectively formed by a first surface section and a second surface section that is angled away from the first surface section. The first surface section extends in a radial and axial direction and is applied to one of the pole tooth flanks. The second surface section extends in the axial direction and in the circumferential direction and is in contact with one of the pole shoe undersides.

On the underside, the base area has the axially extending notch, in which the heat sink can be arranged to fit precisely. In the case of the salient pole rotor, the notch has a triangular cross-section, which is formed by a saddle roof-like base area consisting of two third surface sections that are angled towards each other. In the area of the first and third surface sections, the slot insulation element therefore has a W-shaped profile. The slot insulation element is designed in particular as a dimensionally stable finished part, especially made of synthetic material, which can be inserted axially into the slot, for example.

The heat sink is designed as an elongated cooling element carrying cooling fluid, the axial length of which corresponds to at least one axial length of the slot. In the case of the salient pole rotor, the heat sink is of a triangular-prismatic design and has three lateral surfaces that are angled towards one another for contact with the third surface sections of the slot insulation element and the outer side area of the yoke. The heat sink therefore has a triangular cross-sectional area, which can be arranged to fit precisely in the triangular profile-shaped notch. In particular, the heat sink is designed to conduct cooling fluid from a first end face of the rotor core through the slot to a second end face of the rotor core and from the second end face back to the first end face. For this purpose, the heat sink has at least one cooling duct with a forward flow and a return flow.

In particular, the at least one cooling duct is formed as a recess in a surface of the heat sink facing the notch, which is closed off by the underside of the base area. In the case of the triangular prismatic heat sink, the two upper lateral surfaces have at least one recess, which is covered by the third surface sections of the slot insulation element. The cooling duct is therefore sealed by the mechanical connection between the slot insulation element and the heat sink. For example, the slot insulation element and the heat sink are mechanically connected by synthetic material welding. Such a cooling duct can be formed particularly easily, for example by making at least one recess in the surface of the heat sink, for example by milling it, and then covering this recess with the slot insulation element.

Preferably, the at least one cooling duct is formed as a U-shaped recess, in which a first recess section extends axially in a first of the lateral surfaces of the triangular prismatic heat sink and forms the forward flow of the cooling duct, a second recess section extends axially in a second of the lateral surfaces and forms the return flow of the cooling duct and a third recess section connects the axial recess sections and forms a deflection section of the cooling duct.

In particular, the heat sink has a connection piece or a cooling connection, which has an inlet for the cooling fluid connected to the at least one forward flow and an outlet for the cooling fluid connected to the at least one return flow. For example, multiple recesses can be formed in the surface of the heat sink, which extend in a U-shape over the heat sink and are bundled in the area of the inlet and outlet. The connection piece can, for example, be formed in one piece with the area of the heat sink that has at least one cooling duct and form an end piece of the heat sink. The connection piece is arranged on one of the end faces of the rotor core, on which the fluid conduit device is also located, and the deflection section of the cooling duct is located in the slot on the opposing other end face.

The fluid conduit device, which is fluidically coupled to the connecting pieces of the components, has a collecting ring for coupling to an outlet opening of the rotor shaft of the rotor carrying the cooling fluid. The collecting ring is designed to collect the cooling fluid from the rotor shaft. The rotor shaft of the rotor is therefore hollow and carries a cooling fluid. At least a portion of the cooling fluid can emerge from the rotor shaft into the collecting ring and be distributed to the heat sinks via a distributor duct system of the fluid conduit device, the distributor duct system being fluidically coupled to the collecting ring and to the forward flows of the cooling ducts of the components. The fluid conduit device also has a collector duct system, which is fluidically coupled to the return flows of the cooling ducts of the components in order to collect the cooling fluid from the heat sinks. In addition, the fluid conduit device has at least one separation opening, which is fluidically coupled to the collector duct system and is designed to separate the cooling fluid that is collected from the return flows of the cooling ducts into an environment of the rotor. The cooling fluid emerges from the separation opening in a radial direction and can, for example, be sprayed onto the winding heads of the stator to cool the winding heads.

The fluid conduit device is designed in particular as a fluid conducting body, which has a number of duct branches corresponding to the number of poles, wherein respectively one duct branch is fluidically coupled to two adjacent components and wherein first of the duct branches form distributor ducts of the distributor duct system and second of the duct branches form collector ducts of the collector duct system. The fluid conducting body is arranged on one of the end faces of the rotor core and is attached to the star disc, for example. The fluid conducting body has a feed-through for the rotor shaft. In addition, the fluid conducting body has the duct branches, which can be formed, for example, as holes and corresponding plugs in the fluid conducting body. The duct branches are formed separately from each other. The first and second duct branches are arranged alternately to each other in the circumferential direction and each have an axial branch section, which in the case of the distributor ducts is fluidically coupled to the collecting ring and in the case of the collector ducts is fluidically coupled to a respective separation opening. In addition, the duct branches each have two branch sections that extend from the end face and branch off from the associated axial branch section.

The components that are formed from the respective slot insulation element and the respective heat sink are arranged axially protruding on an underside of the fluid conducting body, overlapping with the ends of the branch sections that extend at the end sides, wherein the ends have axial through-going openings. Inlets of the heat sinks are inserted into the axial through-going openings of the first duct branches so as to couple the distributor ducts to the forward flows of the cooling ducts. Outlets of the heat sinks are inserted into the axial through-going openings of the second duct branches so as to couple the collector ducts to the return flows. The inlets and outlets can, for example, be designed as nozzles of the cooling connection of the heat sink, which are inserted into the respective through-going opening.

The fluid conduit device can also have a partially hollow conduit body, which has a cover area for covering the branches and a coupling area having first and second at least partially axially extending coupling ducts. The coupling area is arranged overlapping with the main branches of the duct branches. The first coupling ducts are fluidically coupled to the collecting ring and the distributor ducts and the second coupling ducts are fluidically coupled to the collector ducts and the at least one separation opening. The conduit body is thus arranged on the fluid conducting plate in such a way that the cover area covers the duct branches in the area of the branches and thus seals them off from the outside and that the extruded coupling area at least partially covers the main branches. These main branches are then coupled to the first or second coupling ducts.

The embodiments presented with reference to the component according to the present disclosure and their advantages apply correspondingly to the assembly according to the present disclosure, to the rotor according to the present disclosure and to the electric machine according to the present disclosure.

Further features of the present disclosure are shown in the claims, the figures and the description of the figures. The features and combinations of features mentioned above in the description as well as the features and combinations of features mentioned below in the description of the figures and/or shown alone in the figures can be used not only in the combination indicated in each case, but also in other combinations or on their own.

The present disclosure will now be explained in more detail with reference to a preferred exemplary embodiment and with reference to the drawings.

DETAILED DESCRIPTION OF THE DRAWINGS

In the figures, identical and functionally identical elements are labeled with the same reference signs.

Figure 1:
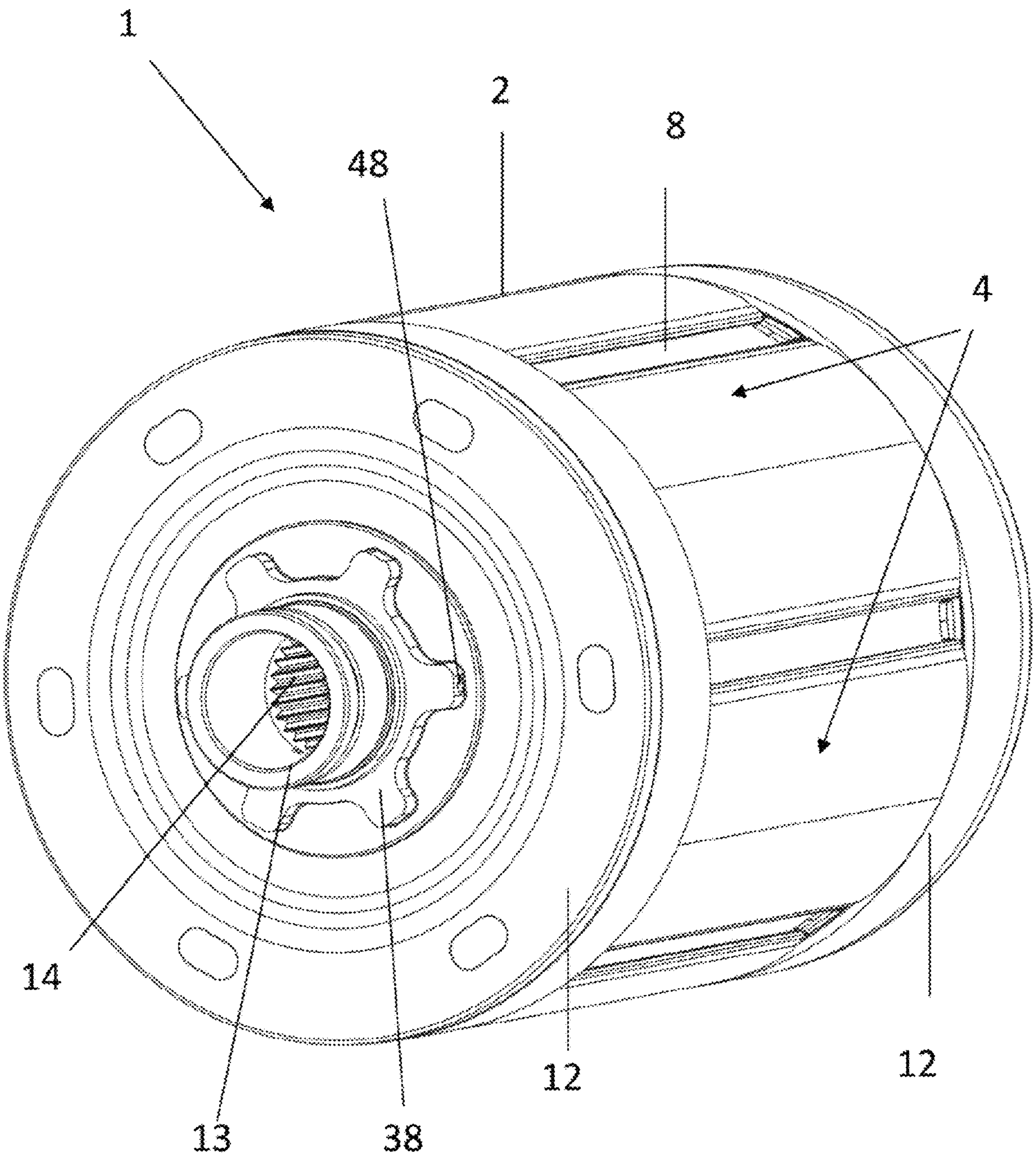
FIG. 1 shows a perspective view of a rotor for an electric machine.
Figure 2:
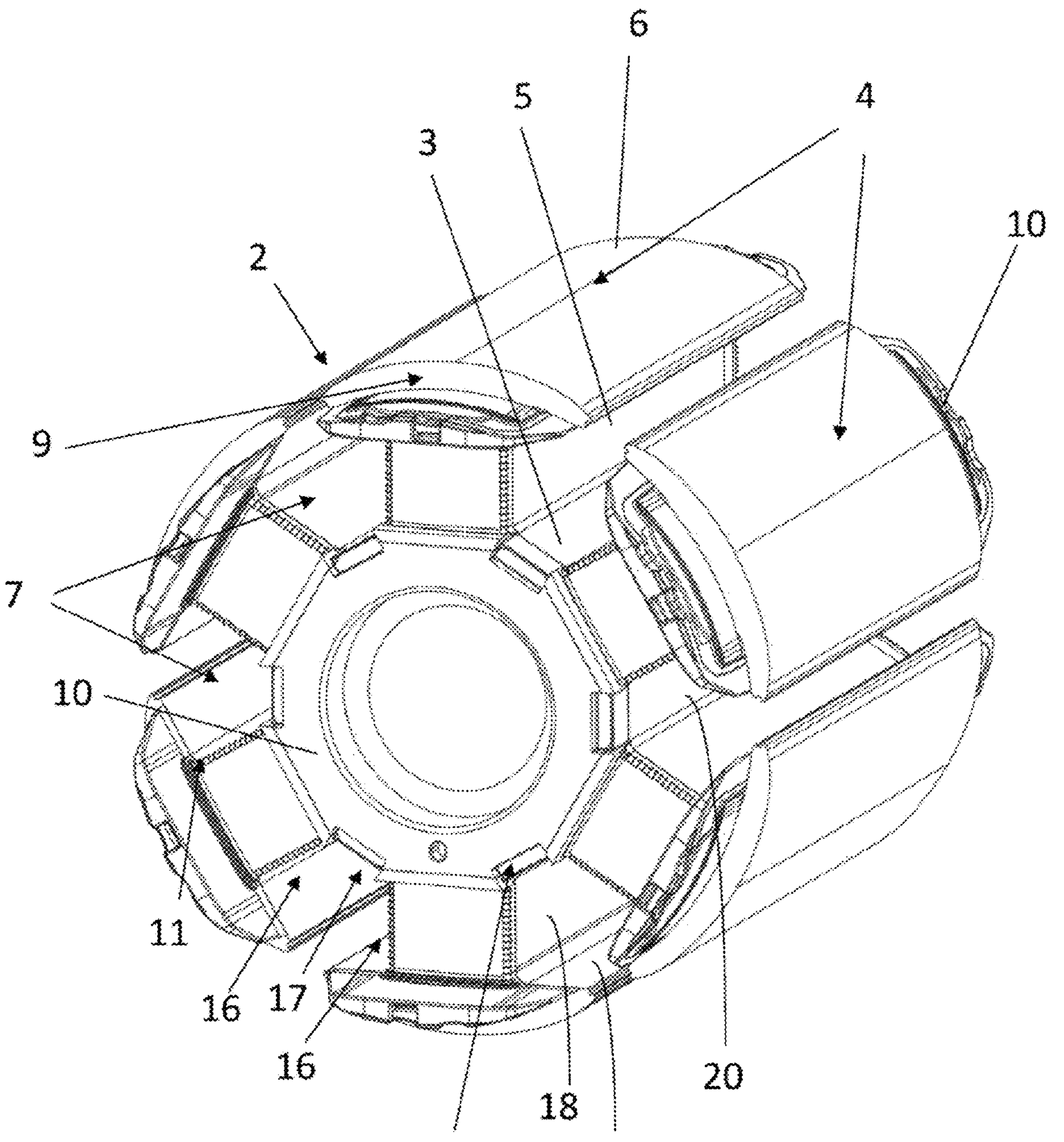
FIG. 2 shows a perspective view of a lamination stack of the rotor, the lamination stack being fitted with star discs.

FIG. 1 shows a perspective view of a rotor 1 for an electric motor of a motor vehicle. The rotor 1 has a rotor core 2, also shown in FIG. 2, which is manufactured here in a salient-pole design. The rotor core 2 can be a lamination stack, for example. The rotor core 2 has a yoke 3 and salient poles 4 which project radially from the yoke 3 and are arranged at a distance from each other in the circumferential direction. Each salient pole 4 has a pole tooth 5 and a pole shoe 6. A slot 7 or pole gap is formed in each case between two adjacent salient poles 4, wherein the slots 7 are designed to receive axial winding sections of windings, not shown here, of the rotor 1, wound around the respective adjacent pole teeth 5. The slots 7 are each closed with a slot closing wedge 8.

End-side winding sections are guided on axially opposing end faces 9 of the rotor core 2 via electrically insulating star discs 10 arranged there. For this purpose, the star discs 10 have, for example, guide slots 11 to provide a transition between the axial and end-side winding sections. The end-side winding sections form winding heads on the end faces 9, the winding heads each being supported against centrifugal forces by a support ring 12 arranged in each case on the respective star disc 10. The support rings 12 and the star discs 10 are mechanically connected, for example pressed together. In addition, the rotor 1 has a rotor shaft 13 which passes axially through the rotor core 2 and can have a toothing 14 for connection to a gearbox input shaft. The rotor shaft 13 is designed in particular to conduct a cooling fluid.

Figure 3:
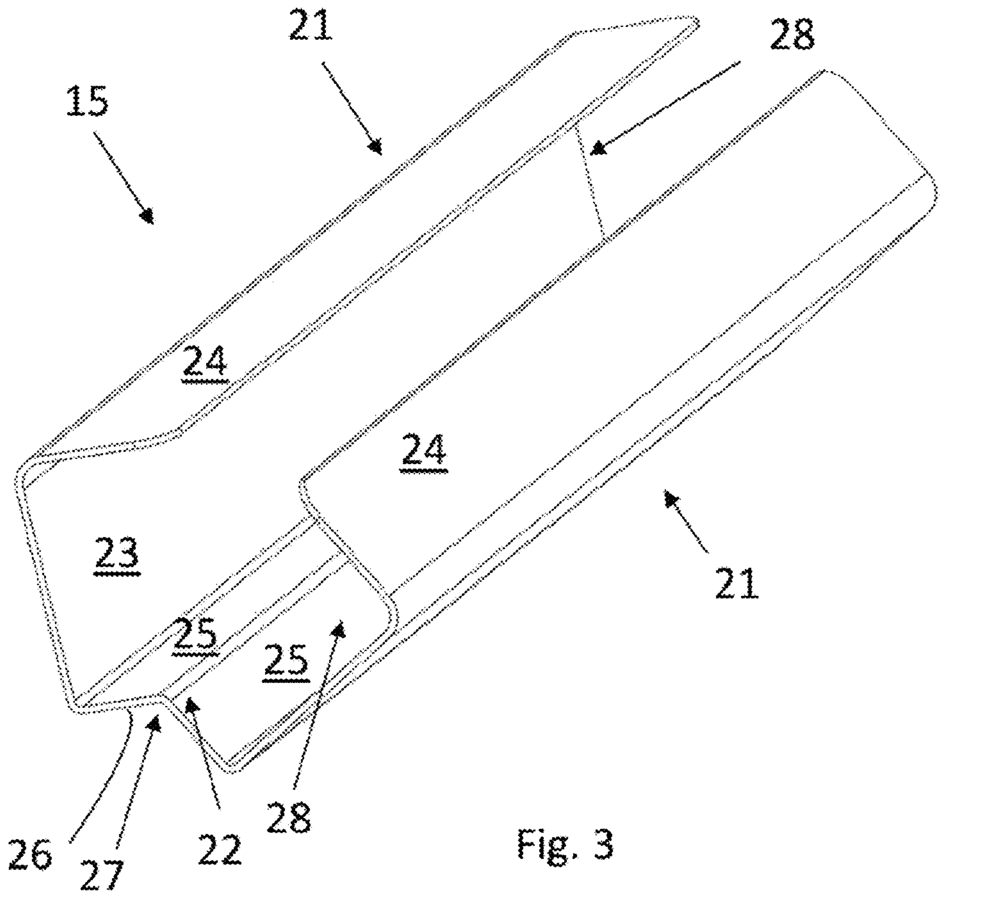
FIG. 3 shows a perspective view of a slot insulation component of the rotor.

In order to electrically insulate the axial winding sections from the rotor core 2, slot insulation elements 15 are arranged in the slots 7, of which one slot insulation element 15 is shown in perspective view in FIG. 3. The slot insulation element 15 is in particular an elongated finished part made of a synthetic material, which can be inserted, for example pushed in, into a respective slot 7 in order to provide lining. Each slot 7 has two slot flanks 16 and a slot base 17. A slot flank 16 is formed here by a pole tooth flank 18 of the pole tooth 5 adjacent to the slot 7 and a pole shoe underside 19 of the pole shoe 6 adjacent to the slot 7. A slot base 17 is formed by an outer side area 20 of the yoke 3 adjacent to the slot 7. In order to line the slot 7, the slot insulating element 15 has two side areas 21 for contact with the slot flanks 16, and a base area 22 for overlapping arrangement with the slot base 17.

The side areas 21 each have a first surface section 23 for contact with a respective pole tooth flank 18 and a second surface section 24 angled, in particular at right angles, to the first surface section 23 for contact with a respective pole shoe underside 19. The base area 22 is saddle roof-shaped and has two third surface sections 25 which are angled towards each other and form a triangular notch 27 on an underside 26 of the base area 22. Due to this arrangement of the surface sections 23, 24, 25 relative to one another, a rectangular profile-shaped slot area 28 is formed in the slot 7 by a first surface section 23, a second surface section 24 and a third surface section 25 respectively. Each slot 7 therefore has two rectangular profile-shaped slot areas 28, wherein a stack with axial winding sections can be arranged in each slot area 28 with a precise fit.

Figure 4:
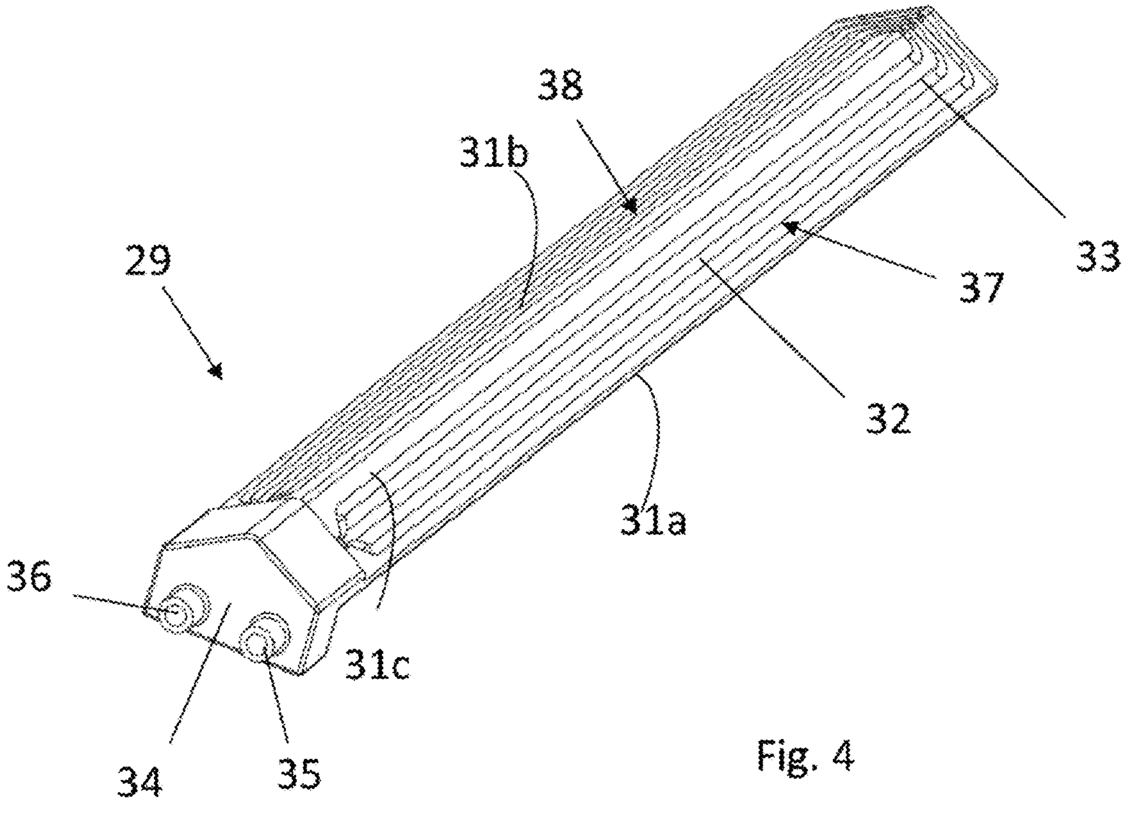
FIG. 4 shows a perspective view of a heat sink of the rotor.
Figure 5:
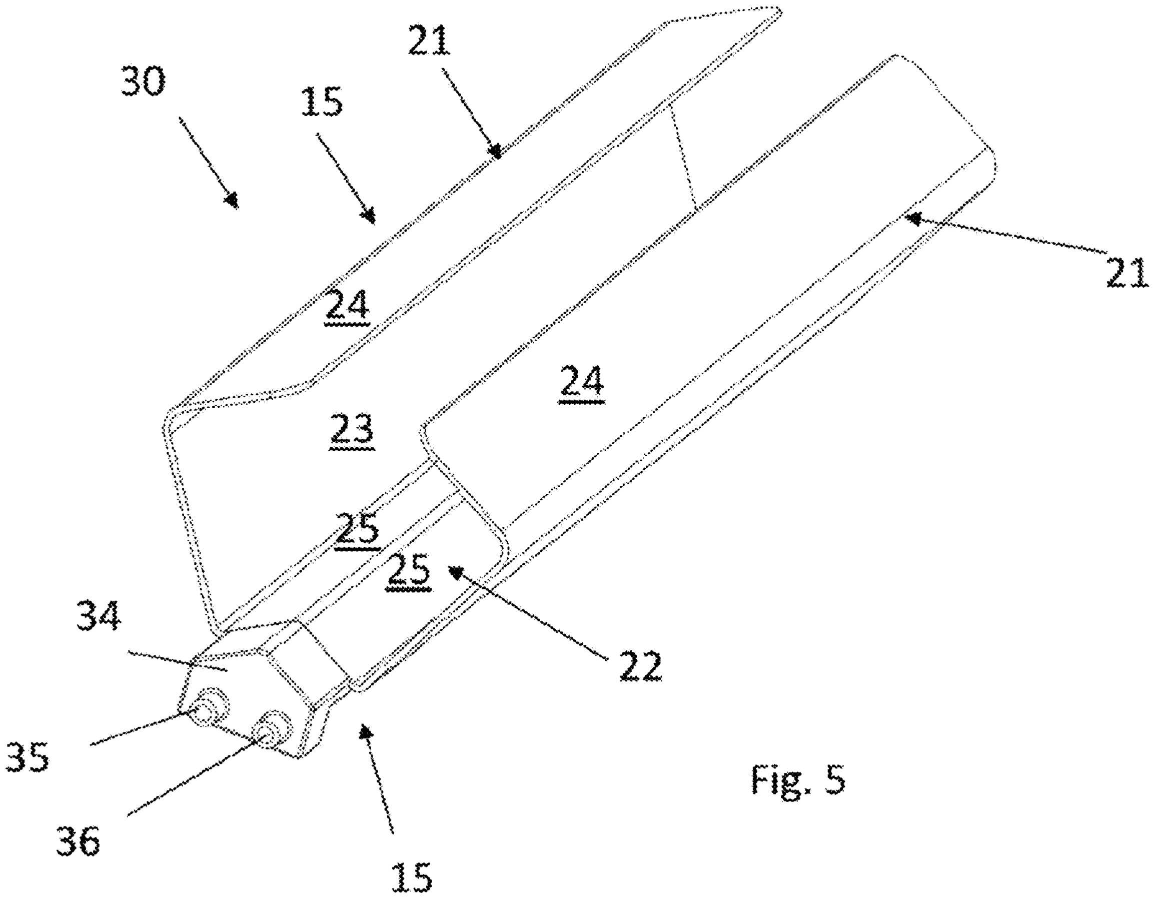
FIG. 5 shows a first perspective view of a component formed by the slot insulation component and the heat sink.
Figure 6:
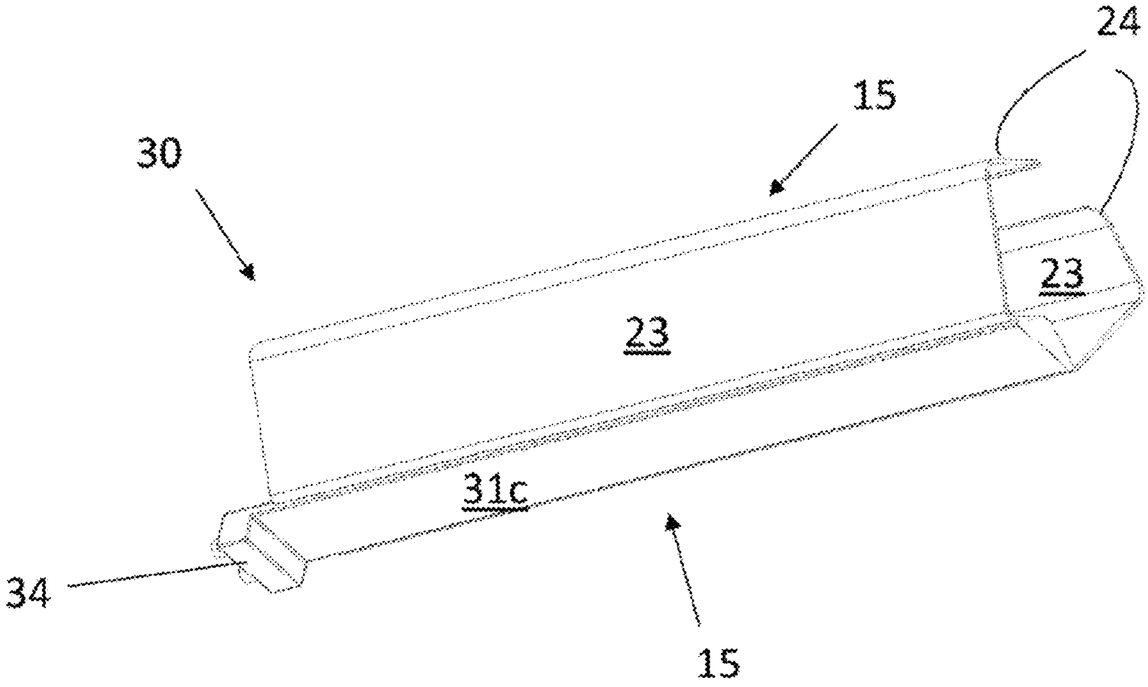
FIG. 6 shows a second perspective view of a component that is formed by the slot insulation component and the heat sink.
Figure 7:
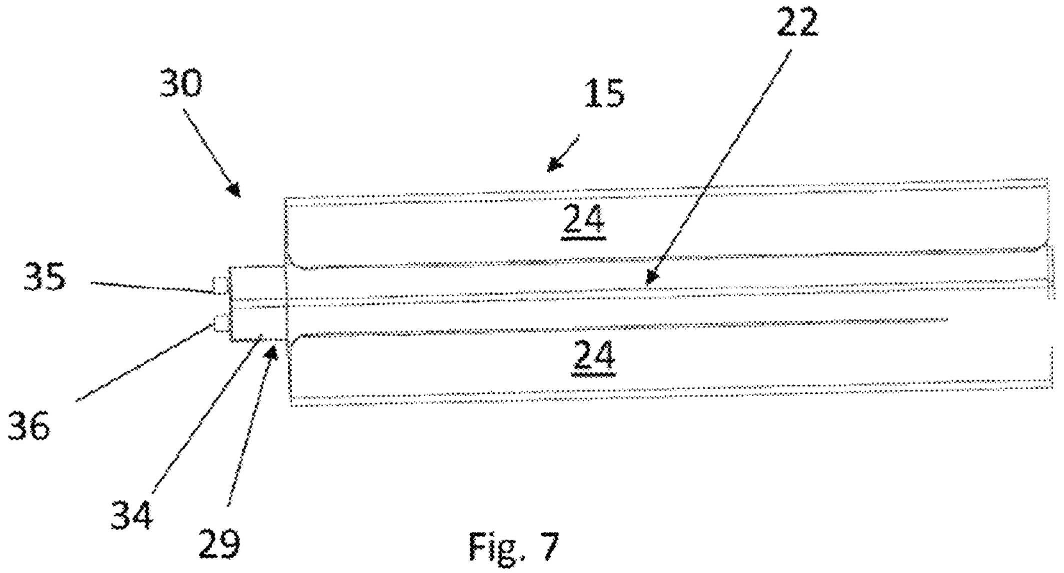
FIG. 7 shows a third perspective view of a component that is formed by the slot insulation component and the heat sink.
Figure 8:
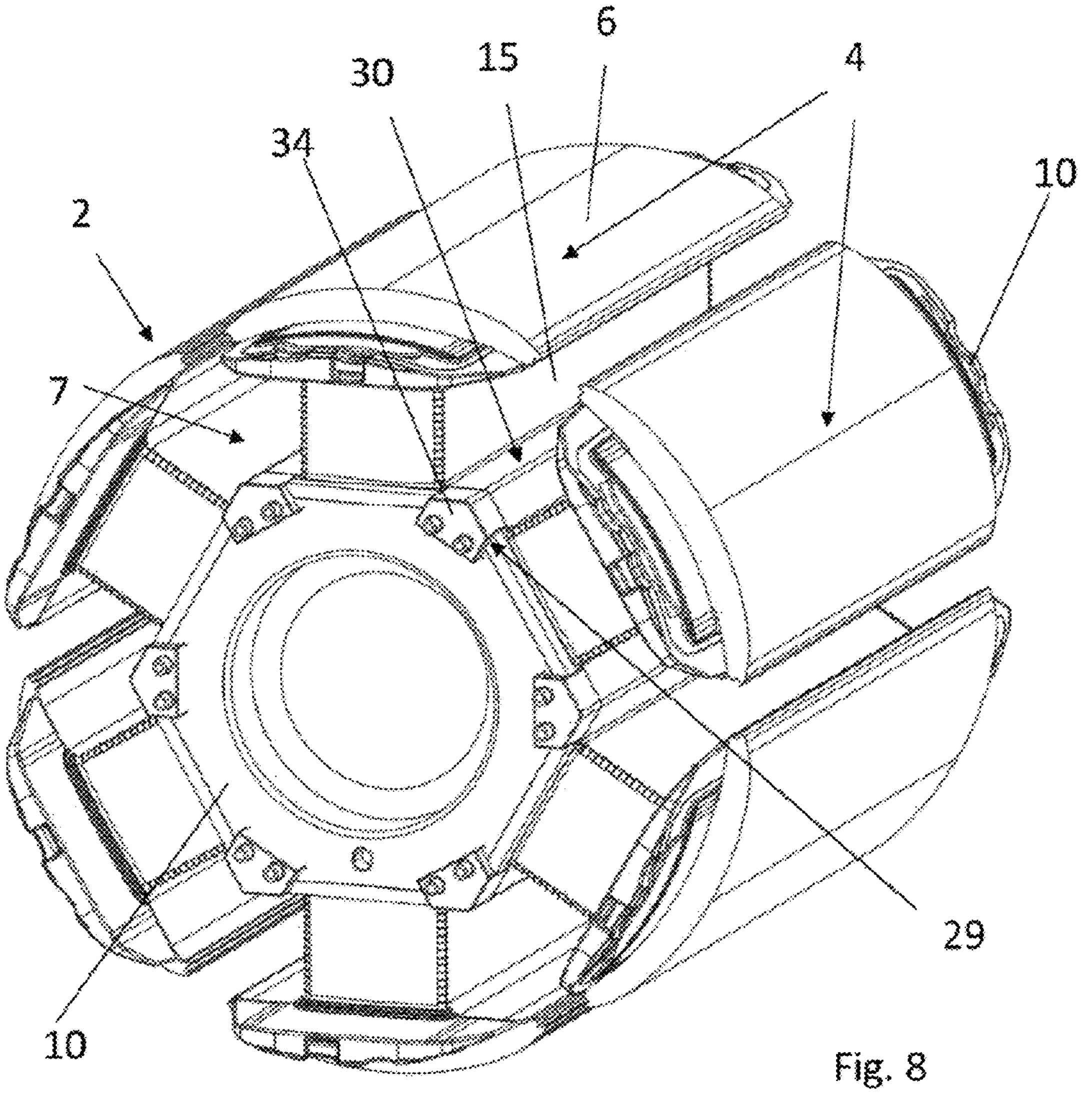
FIG. 8 shows a perspective view of the rotor core that is fitted with the star discs and the components.

A heat sink 29 is arranged in the notch 27 of the slot insulation element 15, it is shown in a perspective view in FIG. 4 and is designed to cool the winding sections arranged in the respective slot 27. This forms the component 30 shown in perspective in FIG. 5. FIG. 6 shows the component 30 from an oblique perspective looking at the component 30 from below. FIG. 7 shows the component 30 in a top view. FIG. 8 shows the rotor core 2 fitted with the components 30. The heat sink 29 is of a triangular-prismatic design and has three lateral surfaces 31*a*, 31*b*, 31*c* arranged in a triangle. Upper lateral surfaces 31*a*, 31*b* are arranged adjacent to the third surface sections 25 of the slot insulation component 15. A lower lateral surface 31*c* is arranged adjacent to the slot base 17, in this case the outer side area 20 of the yoke 3. A shape of the lower lateral surface 31*c* corresponds to a contour of the outer side area 20 of the yoke 3.

The upper lateral surfaces 31*a*, 31*b* facing the notch 27 have multiple axially extending U-shaped recesses 32, which are milled into the upper lateral surfaces 31*a*, 31*b*, for example, and form cooling ducts 33 for conducting a cooling fluid. These cooling ducts 33 are sealed off from the outside when the heat sink 29 is joined, for example welded, to the slot insulation component 15 in that the third surface sections 25 covers the recesses 32. The component 30 arranged in the slot 7 is therefore designed to conduct a cooling fluid through the slot 7 and thereby cool the axial winding sections.

One end of the cooling body 29 is designed here as a connection piece 34 having a nozzle-shaped inlet 35 and a nozzle-shaped outlet 36. The inlet 35 is fluidically connected to recess sections of the recesses 32 of the one upper lateral surface 31*a*, which form forward flows 37 of the cooling ducts 33, and the outlet 36 is connected to recess sections of the recesses 32 of the other upper lateral surface 31*b*, which form return flows 38 of the cooling ducts 33. The connection piece 34 is angled and thus extends in a radial direction in some areas over one of the end faces 9 of the rotor core 2. For example, one of the star discs 10 has a receptacle 39 for the connection pieces 34 in the area of each slot 7, so that the connection pieces 34 are recessed in some areas in the star disc 10 and are connected in a positive-locking manner to the star disc 10 at least in the circumferential direction.

Figure 9:
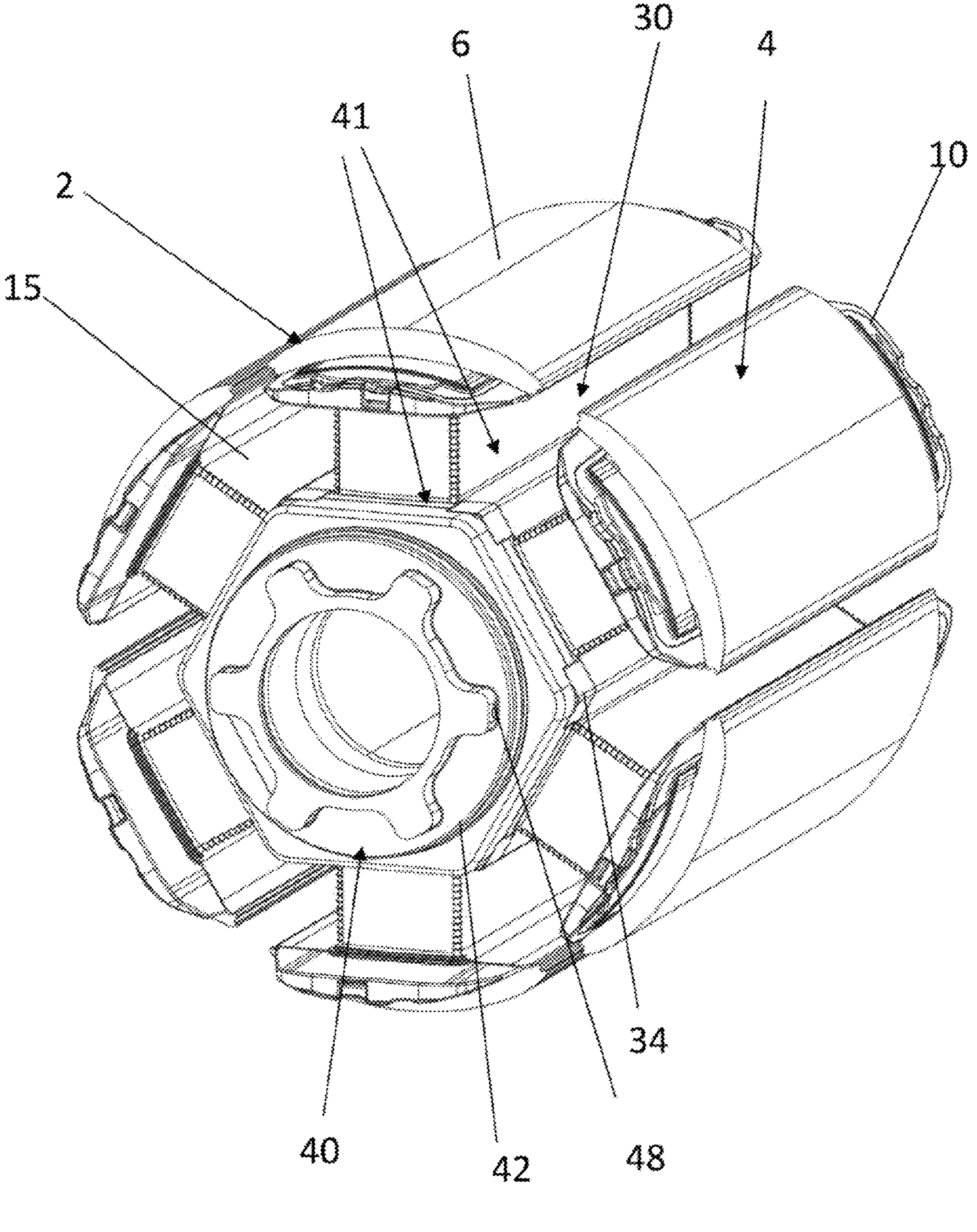
FIG. 9 shows a perspective view of the rotor core that is fitted with the star discs and an assembly that comprises the components.
Figure 10:
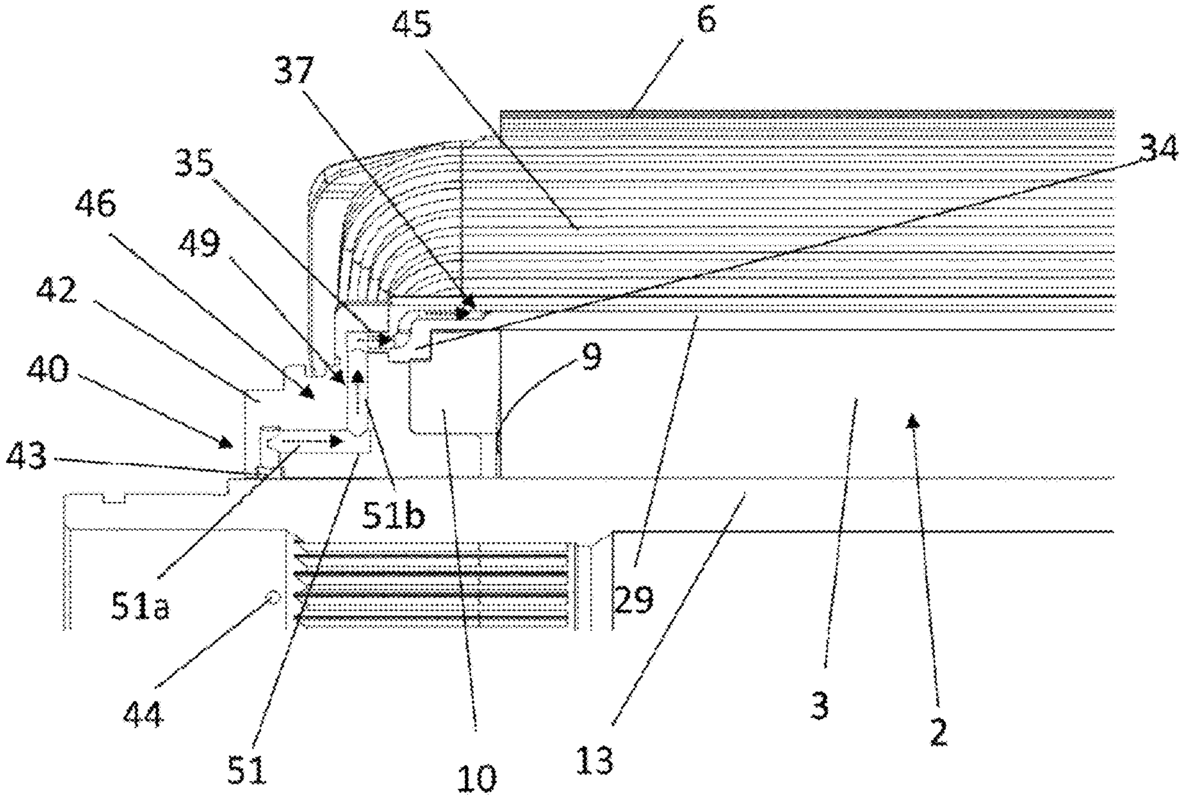
FIG. 10 shows a first longitudinal sectional view of the rotor.

In order to distribute the cooling fluid to the components 30 and to collect the cooling fluid, which is conducted from the components 30 through the slots 7, from the components 30, a fluid conduit device 40 is provided, which is fluidically and mechanically coupled to the components 30, forming an assembly 41. FIG. 9 shows the rotor core 2 that is fitted with the star discs 10 and the assembly 41. The fluid conduit device 40 is attached to one of the star discs 10 and thus arranged on one of the end faces 9 of the rotor core 2. The fluid conduit device 40 is designed as a one-piece fluid conducting body 42, which has a collecting ring 43, which is coupled to the forward flows 37 of the cooling ducts 33 of the components 30 and via which the cooling fluid can be supplied to the cooling ducts 33. FIG. 10 shows a longitudinal section through the rotor 1 in the area of an outlet opening 44 to the collecting ring 43. FIG. 10 also shows the windings 45 of the rotor 1 wound around the salient poles 4. The outlet opening 44 is formed, for example, as a radial bore in the rotor shaft 13 that carries the cooling fluid. For this purpose, the collecting ring 43 is arranged at the axial height on the rotor shaft 13 at which the outlet openings 44 are located. The fluid conduit device 40 also has a distributor duct system 46, which is coupled to the collecting ring 43 and the inlets 35 of the connecting pieces 34. In this way, the cooling fluid from the rotor shaft 13 can be fed into the collecting ring 43 via the distributor duct system 46 to the forward flows 37 of the cooling ducts 33 of the components 30.

Figure 11:
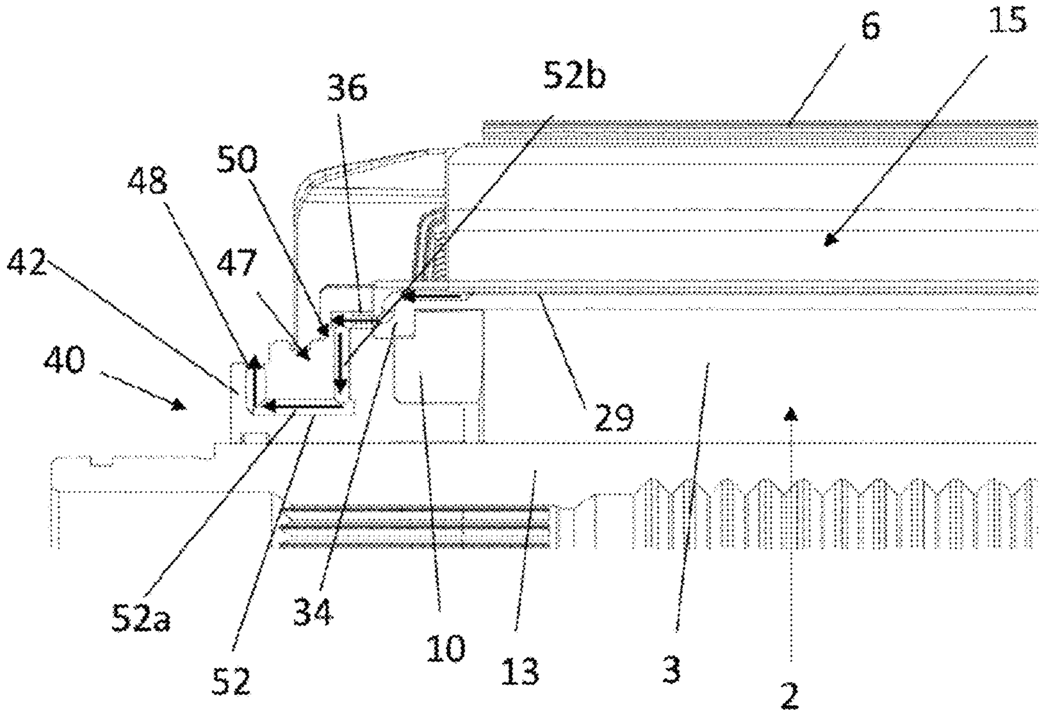
FIG. 11 shows a second longitudinal sectional view through the rotor.

The fluid conduit device 40 also has a collector duct system 47, which is coupled to the outlets 36 of the connecting pieces 34 of the components 30 and via which the cooling fluid collected from the components 30 can be conducted to separation openings 48 of the fluid conduit device 38. The cooling fluid can be separated into an environment of the rotor 1 via the separation openings 48. FIG. 11 shows a longitudinal section through the rotor 1 in the area of one of the separation openings 48.

The distributor duct system 46 has multiple separate distributor ducts 49, wherein respectively one distributor duct 49 is designed to distribute the cooling fluid to two adjacent components 30 and thus to two adjacent slots 7. The collector duct system 47 also has multiple separate collector ducts 50, wherein one collector duct 50 is designed to receive the cooling fluid from two adjacent components 30 and thus from two adjacent slots 7. The distributor ducts 49 and the collector ducts 50 are arranged alternately to each other in the circumferential direction. The components 30 are therefore arranged in such a way that in the case of two adjacent components 30, cooling duct sections of the same type, i.e. either the forward flows 37 or the return flows 38, are arranged adjacent to each other. The cooling duct sections arranged on both sides of a salient pole 4 therefore flow through the respective slots 7 in the same direction.

The distributor ducts 49 and the collector ducts 50 are designed as duct branches 51, 52. Axial branch sections 51*a* of the first duct branches 51, which form the distributor ducts 49, are coupled to the collecting ring 43. Axial branch sections 52*a* of the duct branches 52 which form the collector ducts 50 are coupled to the separation openings 48.

Figure 12:
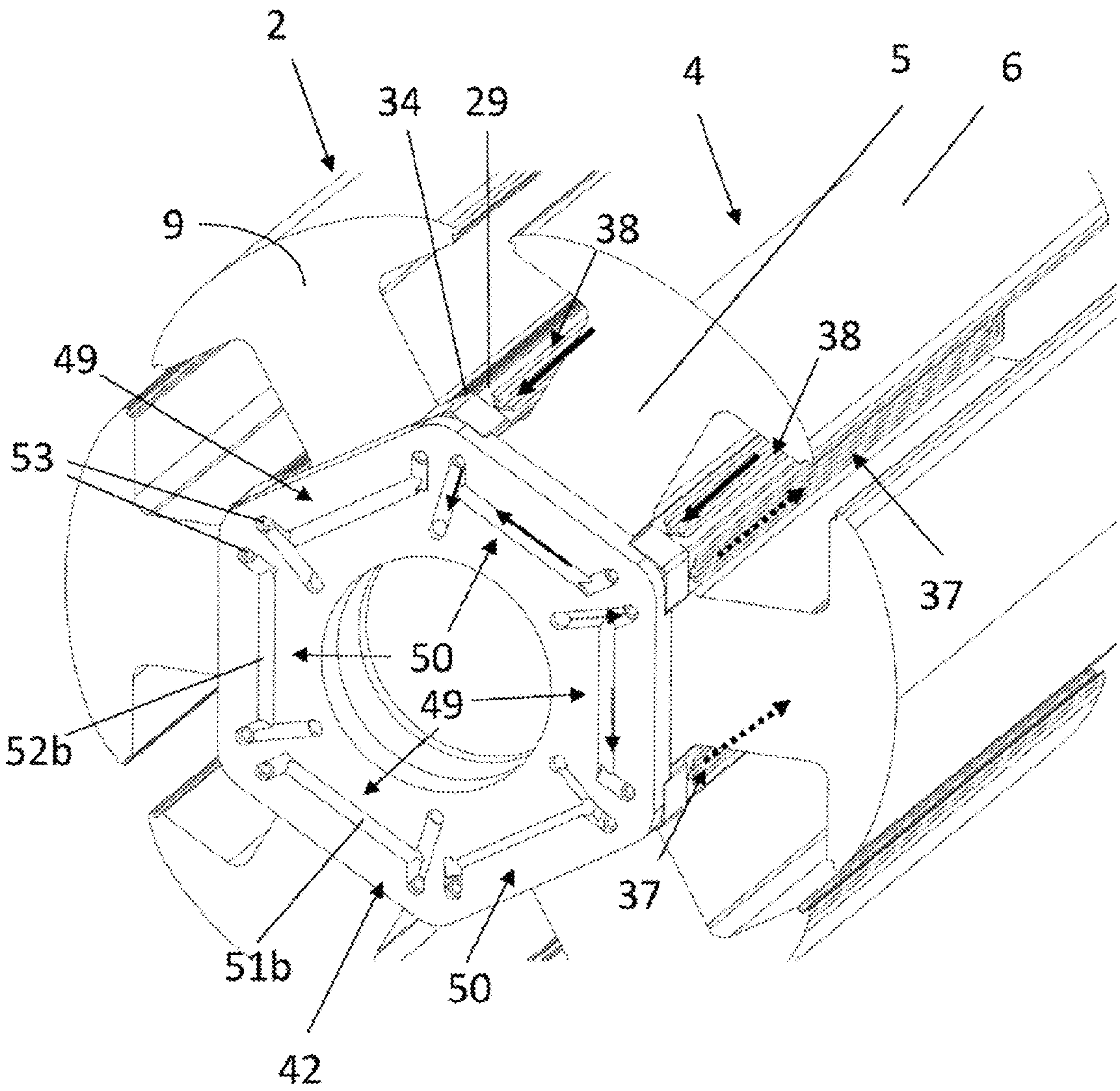
FIG. 12 shows a cross-sectional view through the rotor in the area of a fluid conducting device of the assembly.

End-side branch sections 51*b* of the first duct branches 51, which are shown in the cross-sectional view through the rotor 1 in FIG. 12, are fluidically coupled to the forward flows 37 of the heat sinks 30. End-side branch sections 52*b* of the second duct branches 52 are fluidically coupled to the forward flows 38 of the heat sinks 30. For this purpose, the ends of the end-side branches 51*b*, 52*b* each have an axial through-going opening 53, into which the inlets 35 are inserted in the case of the first duct branch sections 51 and into which the outlets 36 are inserted in the case of the second duct branches 52. In order to distribute the cooling fluid to the cooling ducts 33, the cooling fluid from the collecting ring 43 enters the axial branch sections 51*a* of the first duct branches 51, is conducted into the end-side branch sections 51*b* and enters the forward flows 37 at their ends via the respective through-going opening 53. In order to remove the cooling fluid from the cooling ducts 33, the cooling fluid from the return flows 38 enters the end-side branch sections 52*b* of the second duct branches 52 via the respective through openings 53, is conducted into the axial branch sections 52*a* and exits into the environment via the separation openings 48.

The invention claimed is:

1. A component for lining a slot that is formed between two poles of a rotor core of a rotor and that extends axially between two end faces of the rotor core, the component comprising:

a slot insulation element configured to electrically insulate winding sections of windings of the rotor from the rotor core, the electrically insulated winding sections being arranged in the slot, the slot insulation element comprising:

two side areas configured to contact with slot flanks of the slot; and a base area configured in an overlapping arrangement with a slot base of the slot, wherein an underside of the base area of the slot insulation element facing the slot base comprises an axially extending notch, and a heat sink with at least one cooling fluid-carrying cooling duct configured to cool the winding sections that are arranged in the slot insulation element, the heat sink being arranged in the notch of the slot insulation element for arrangement on the slot base and being mechanically connected to the slot insulation element, wherein the heat sink has at least two lateral surfaces, wherein the at least one cooling duct is configured as a U-shaped recess, wherein a first recess section extends axially in a first of the at least two lateral surfaces and forms a forward flow for the cooling fluid, wherein a second recess section extends axially in a second of the at least two lateral surfaces and forms a return flow for the cooling fluid, and wherein a third recess section connects the first and second recess sections and forms a deflection section for the cooling fluid.

2. The component according to claim 1, wherein the at least one cooling duct is formed as a recess in a surface of the heat sink facing the notch, which is closed off by the underside of the base area.

3. The component according to claim 1, wherein the slot insulation element is a dimensionally stable finished part formed of a synthetic material that is welded to the heat sink.

4. The component according to claim 1, wherein the component is configured for arrangement in the slot defined between salient poles of a salient rotor core, and by pole teeth and pole shoes of the salient poles and a yoke of the salient pole rotor core, wherein the side areas of the slot insulation element are configured to contact the slot flanks formed by pole tooth flanks of the pole teeth and pole shoe undersides of the pole shoes, and wherein each has a first surface section configured to contact the respective pole tooth flank and a second surface section angled with respect to the first surface section and configured to contact the respective pole shoe underside, wherein the base area has a saddle roof shape and is configured for overlapping arrangement with an outer side area of the yoke forming the slot base, and has two third surface sections that are angled towards one another and form the notch having a triangular profile shape, so that by respectively one of the first surface sections, one of the second surface sections, and one of the third surface sections, in each case, a rectangular profile-shaped slot area of the slot is formed for receiving the winding sections of a respective winding held by the salient pole adjacent to the slot area, and wherein the heat sink is of a triangular prismatic design and has three lateral surfaces that are angled towards one another for contact with the third surface sections of the slot insulation element and the outer side area of the yoke.

5. The component according to claim 1, wherein the heat sink has a connection piece that has an inlet for the cooling fluid connected to the forward flow and an outlet for the cooling fluid connected to the return flow.

6. An assembly for arrangement on a rotor core of a rotor of an electric machine, comprising:

a plurality of the components according to claim 1 corresponding to a number of slots; and a fluid conduit device arranged on an end face of the rotor core, which is fluidically coupled to the cooling ducts of the heat sinks for distributing the cooling fluid to the plurality of components and for collecting the cooling fluid from the plurality of components, wherein the fluid conduit device comprises:

a collecting ring configured to couple to an outlet opening of a cooling fluid-carrying rotor shaft of the rotor, which is configured to receive the cooling fluid from the rotor shaft;

a distributor duct system that is fluidically coupled to the collecting ring and, for distributing the cooling fluid to the heat sinks, to forward flows of the cooling ducts of the plurality of components;

a collector duct system that is fluidically coupled to return flows of the cooling ducts of the plurality of components configured to receive the cooling fluid from the heat sinks; and at least one separation opening that is fluidically coupled to the collector duct system and is configured to separate the cooling fluid collected from the return flows of the cooling ducts into an environment of the rotor.

7. The assembly according to claim 6, wherein the fluid conduit device is configured as a fluid conducting body that has a number of duct branches corresponding to a number of poles, wherein, in each case, one duct branch is fluidically coupled to two adjacent components of the plurality of components, and wherein first branches of the duct branches form distributor ducts of the distributor duct system, and second branches of the duct branches form collector ducts of the collector duct system.

8. The assembly according to claim 7, wherein the duct branches each have an axial branch section and two branch sections extending at an end side and issuing from the associated axial branch section, wherein the axial branch sections of the first duct branches are fluidically coupled to the collecting ring, and wherein the axial branch sections of the second duct branches are fluidically coupled to respectively a separation opening.

9. The assembly according to claim 8, wherein the plurality of components are arranged axially protruding on an underside of the fluid conducting body overlapping with ends of the branch sections extending on the end side, wherein the ends have axial through-going openings, into which inlets of the heat sinks are inserted for coupling the distributor ducts to the forward flows of the cooling ducts and outlets of the heat sinks are inserted for coupling the collector ducts to the return flows.

10. A rotor for an electric machine comprising:

a rotor core;

windings arranged in slots of the rotor core; and an assembly according to claim 6, wherein the plurality of components are arranged in the slots of the rotor core between axial winding sections of the windings, and wherein the fluid conduit device is arranged on one of the end faces of the rotor core.

11. An electric machine for a motor vehicle, comprising:

a stator; and the rotor according to claim 10 that is mounted so as to be configured to rotate with respect to the stator.

* * * * *